(12) United States Patent
Yang et al.

(10) Patent No.: US 12,056,380 B2
(45) Date of Patent: Aug. 6, 2024

(54) METHODS AND APPARATUS TO DEDUPLICATE DUPLICATE MEMORY IN A CLOUD COMPUTING ENVIRONMENT

(71) Applicant: Intel Corporation, Santa Clara, CA (US)

(72) Inventors: Bin Yang, Shanghai (CN); Jia Bao, Shanghai (CN); Ying Huang, Shanghai (CN); Yao Zu Dong, Shanghai (CN); Yong Yao, Cupertino, CA (US); Fengqian Gao, Shanghai (CN); Mohammad Haghighat, San Jose, CA (US); Mingqiu Sun, Beaverton, OR (US); Zhen Zhou, Shanghai (CN); Tao Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/008,109

(22) PCT Filed: Jul. 2, 2020

(86) PCT No.: PCT/CN2020/099876
§ 371 (c)(1),
(2) Date: Dec. 2, 2022

(87) PCT Pub. No.: WO2022/000405
PCT Pub. Date: Jan. 6, 2022

(65) Prior Publication Data
US 2023/0280922 A1 Sep. 7, 2023

(51) Int. Cl.
*G06F 3/06* (2006.01)
(52) U.S. Cl.
CPC .......... *G06F 3/0641* (2013.01); *G06F 3/0608* (2013.01); *G06F 3/067* (2013.01)

(58) Field of Classification Search
None
See application file for complete search history.

(56) References Cited

U.S. PATENT DOCUMENTS 8,732,403 B1 * 5/2014 Nayak ................... G06F 3/0619
711/170
9,715,434 B1 * 7/2017 Xu ........................... G06F 3/067
(Continued)

FOREIGN PATENT DOCUMENTS

WO 2016063150 A1 4/2016

OTHER PUBLICATIONS

International Searching Authority, "International Search Report and Written Opinion," issued in connection with PCT Application No. PCT/CN2020/099876, mailed Mar. 31, 2021, 6 pages.
(Continued)

*Primary Examiner* — Christopher D Birkhimer
(74) *Attorney, Agent, or Firm* — Hanley, Flight & Zimmerman, LLC

(57) ABSTRACT

Methods, apparatus, systems and articles of manufacture to deduplicate duplicate memory in a cloud-computing environment are disclosed herein. An example apparatus to deduplicate duplicate memory comprises a parser to parse process information corresponding to instances of an application, a group generator to group process information into application groups based on the process information indicating instances corresponding to the same directory paths and application names, a data structure generator to generate a pair of binary search trees for an application group, and a merge controller to deduplicate duplicate memory contents detected in the application group.

25 Claims, 10 Drawing Sheets

(56) References Cited

U.S. PATENT DOCUMENTS

| | | | | |
|---|---|---|---|---|
| 9,904,480 | B1* | 2/2018 | Singh | G06F 16/128 |
| 9,984,090 | B1* | 5/2018 | Shang | G06F 16/13 |
| 10,108,543 | B1* | 10/2018 | Duggal | G06F 11/14 |
| 10,108,544 | B1* | 10/2018 | Duggal | G06F 11/14 |
| 10,229,127 | B1* | 3/2019 | Shang | G06F 12/0833 |
| 10,509,780 | B2* | 12/2019 | Brosch | G06F 16/2272 |
| 10,649,676 | B1 | 5/2020 | De Smet et al. | |
| 10,664,165 | B1* | 5/2020 | Faibish | G06F 3/0638 |
| 10,691,362 | B2 | 6/2020 | Tsirkin et al. | |
| 10,795,812 | B1* | 10/2020 | Duggal | G06F 3/067 |
| 2008/0144079 | A1* | 6/2008 | Pandey | H03M 7/30 358/1.15 |
| 2010/0077013 | A1* | 3/2010 | Clements | G06F 16/1748 707/822 |
| 2010/0088296 | A1* | 4/2010 | Periyagaram | G06F 16/183 707/E17.014 |
| 2010/0125553 | A1* | 5/2010 | Huang | G06F 11/1453 707/661 |
| 2010/0174881 | A1* | 7/2010 | Anglin | G06F 11/1453 711/E12.103 |
| 2010/0281081 | A1* | 11/2010 | Stager | G06F 9/5022 707/814 |
| 2010/0333116 | A1* | 12/2010 | Prahlad | G06F 3/061 713/153 |
| 2011/0066628 | A1* | 3/2011 | Jayaraman | G06F 16/1748 707/758 |
| 2011/0071989 | A1* | 3/2011 | Wilson | G06F 16/1748 707/E17.01 |
| 2013/0018851 | A1* | 1/2013 | Jayaraman | G06F 3/0641 707/E17.005 |
| 2013/0080404 | A1* | 3/2013 | Smith | G06F 16/1748 707/E17.005 |
| 2013/0080405 | A1* | 3/2013 | Smith | G06Q 10/107 707/E17.005 |
| 2013/0086006 | A1* | 4/2013 | Colgrove | G06F 16/137 707/E17.005 |
| 2013/0097380 | A1* | 4/2013 | Colgrove | G06F 3/0608 711/E12.017 |
| 2014/0114932 | A1* | 4/2014 | Mallaiah | G06F 3/0641 707/E17.032 |
| 2015/0205816 | A1* | 7/2015 | Periyagaram | G06F 11/1453 707/827 |
| 2015/0261776 | A1* | 9/2015 | Attarde | G06F 16/1748 707/664 |
| 2016/0110291 | A1 | 4/2016 | Gordon et al. | |
| 2016/0350324 | A1* | 12/2016 | Wang | G06F 16/137 |
| 2017/0038978 | A1* | 2/2017 | Li | G06F 3/0611 |
| 2017/0351697 | A1* | 12/2017 | Brosch | H03M 7/3091 |
| 2018/0059956 | A1 | 3/2018 | Tsirkin et al. | |
| 2018/0314727 | A1* | 11/2018 | Epstein | G06N 5/01 |
| 2019/0179538 | A1 | 6/2019 | Van Riel et al. | |
| 2020/0310686 | A1* | 10/2020 | Truong | G06F 3/061 |
| 2021/0374021 | A1* | 12/2021 | Santhakumar | G06F 3/0659 |

OTHER PUBLICATIONS

International Searching Authority, "International Search Report," issued in connection with International Patent Application No. PCT/CN2020/099876, mailed on Mar. 31, 2021, 3 pages.

International Searching Authority, "International Preliminary Report on Patentability," issued in connection with International Patent Application No. PCT/CN2020/099876, issued on Jan. 12, 2023, 5 pages.

International Searching Authority, "Written Opinion of the International Searching Authority," issued in connection with International Patent Application No. PCT/CN2020/099876, mailed on Mar. 31, 2021, 3 pages.

* cited by examiner

```
~ $ps ax | grep apache2 | grep -v 'grep'
4225 ?        Ss   0:00 /usr/sbin/apache2 -k start
4226 ?        Sl   0:00 /usr/sbin/apache2 -k start
4227 ?        Sl   0:00 /usr/sbin/apache2 -k start
```

FIG. 2A

```
~$ ps ax | grep apache2 | grep -v 'grep' | awk '{print $1}' | while read pid; do cat /proc/$pid/cmdline; echo -e '\n'; done
/usr/sbin/apache2-kstart
/usr/sbin/apache2-kstart
/usr/sbin/apache2-kstart
```

FIG. 2B

METHODS AND APPARATUS TO DEDUPLICATE DUPLICATE MEMORY IN A CLOUD COMPUTING ENVIRONMENT

RELATED APPLICATION

This patent arises from a U.S. national stage patent application under 35 U.S.C. § 371 of International Patent Application No. PCT/CN2020/099876, which was filed on Jul. 2, 2020. International Patent Application No. PCT/CN2020/099876 is hereby incorporated herein by reference in its entirety. Priority to International Patent Application No. PCT/CN2020/099876 is hereby claimed.

FIELD OF THE DISCLOSURE

This disclosure relates generally to cloud computing systems, and, more particularly, to deduplicating duplicate memory in a cloud computing environment.

BACKGROUND

Container-based cloud computing allows multiple computing workloads to run in containers isolated from one another in the same server at the same time. In container-based cloud computing, a runtime engine creates a container for an application process. A container includes dependencies, such as libraries or binaries, specific to an application so that the application can run in an isolated fashion within that container without having to access resources outside the container.

BRIEF DESCRIPTION OF THE DRAWINGS

FIGS. 2A and 2B are screenshots illustrating process information collected using a proc filesystem command.

Figure 1:
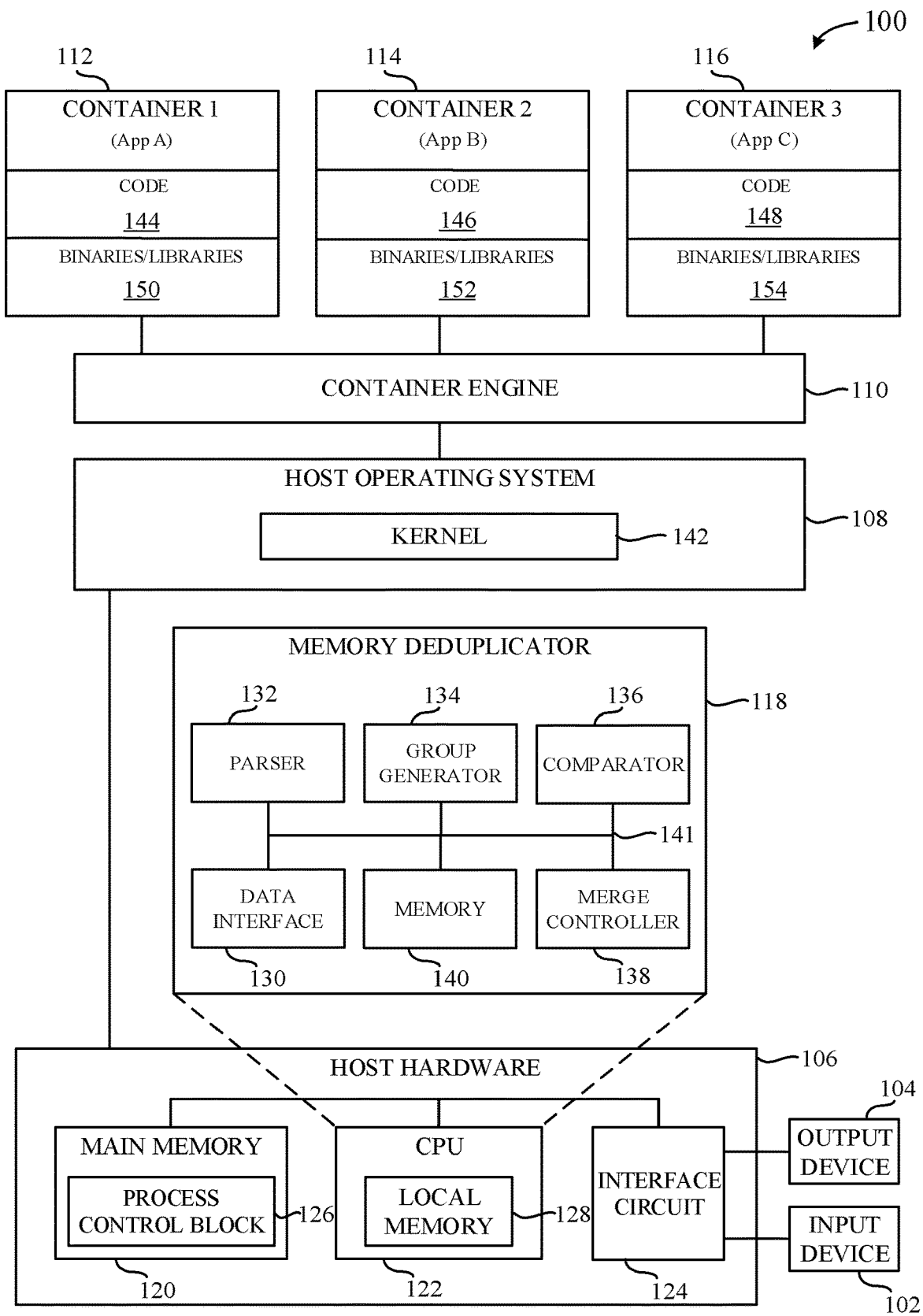
FIG. 1 is a block diagram of an example memory deduplicator to deduplicate memory in a cloud computing environment in accordance with teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real-world delays for computing time, transmission, etc. Thus, unless otherwise specified, "substantially real time" refers to real time +/−1 second.

DETAILED DESCRIPTION

In container-based cloud computing, a single server might run multiple instances (e.g., a few instances to several thousand instances) of an application at a time. Each instance of an application is allocated a memory space to store corresponding data during execution. This allocated memory space associated with an instance of an application is referred to as a memory region. In some examples, a memory region associated with an instance of an application is referred to as a memory page. As more application instances are started, available memory decreases. As such, memory becomes a limiting factor in how many application instances can run concurrently on a single server.

Examples disclosed herein reduce memory consumption by identifying opportunities to share memory across instances of an application using deduplication. In some examples, deduplication involves deallocating redundant or duplicate memory regions and configuring processes to using a same memory region storing the same contents used by those processes.

A prior deduplication technique is Kernel Same-page Merging (KSM). KSM is application unaware meaning it requires a developer to register memory regions as candidates for merging using an madvise system call. KSM maintains two red-black trees that together include pointers to registered memory regions. One red-black tree is stable and the other red-black tree is unstable. The stable tree includes pointers to memory regions previously merged using KSM, and the unstable tree includes pointers to memory regions that KSM determines to be unchanged for a period of time. KSM compares two memory regions at a time to detect and deduplicate identical memory regions. KSM deduplicates identical memory regions by reducing them to a single region.

A drawback of such prior technique is that, because KSM was originally designed for Kernel-based Virtual Machines (KVM), it is not suitable for cloud computing. Further, KSM is application unaware because it does not utilize information regarding which application a memory region is associated with. Rather, KSM uses the madvise system call to register memory regions as candidates for merging.

As a result, KSM might compare a memory region from an instance of one application with a memory region from an instance of a different application. For example, KSM might compare a memory region from an instance of a weather application with a memory region from an instance of a game application. Because the two instances are associated with different applications, there is a low probability that the memory regions associated with these instances will contain duplicate data.

Other prior variations of KSM also exist, such as Ultra Kernel Same-Page Merging (UKSM), KSM++, and Smart memory deduplication (SmartMD). Like original KSM, none of these versions are application aware. These versions also have drawbacks that make them unsuitable for use in cloud computing environments. For example, UKSM monitors the change rate of different memory pages and builds a statistics model to separate memory in different regions, which can increase performance overhead. KSM++ uses an I/O hint-based approach that is not compatible with cloud computing. SmartMD operates on the assumption that smaller pages are less likely to contain duplicate memory. However, since these prior solutions are application unaware, they cannot leverage the assumption that processes instantiated from the same application are more likely to contain duplicate memory than processes instantiated from different applications.

Unlike prior techniques, examples disclosed herein provide an application-aware deduplication solution that may be used in multiple computing environments, including cloud computing environments. Examples disclosed herein eliminate the need for developers to register memory regions before they can be evaluated for deduplication. By leveraging the assumption that processes instantiated from the same application have a higher probability of containing duplicate memory regions, examples disclosed herein reduce memory consumption without a significant increase in performance overhead.

In some examples, a parser parses process information corresponding to instances of one or more applications, a group generator groups the process information into groups based on the process information corresponding to the same application, a data structure generator generates a pair of binary search trees for at least one group, and a merge controller deduplicates duplicate memory contents detected in the groups.

FIG. 1 is a block diagram of an example memory deduplicator 118 to deduplicate heap memory in a container-based cloud computing environment by leveraging characteristics of the cloud computing model such as context information of applications in cloud computing. In this manner, examples disclosed herein implement an application aware KSM (A-KSM) that can improve memory and processor resource usage by not having duplicate contents in heap memory corresponding to multiple instances of the same application in container-based cloud computing environments. In some examples, A-KSM techniques disclosed herein can result in 30% CPU cost savings relative to not using examples disclosed herein. Although examples disclosed herein are described in connection with containers, examples disclosed herein need not be implemented in container-based environments and may be used to deduplicate memory associated with multiple instances of applications running in non-container environments.

The example container-based cloud computing environment 100 of FIG. 1 includes an example host hardware system 106, an example host operating system 108, an example container engine 110, an example container 112, an example container 114, an example container 116, and an example memory deduplicator 118.

The example host hardware system 106 illustrated in FIG. 1 includes an example main memory 120, an example central processing unit (CPU) 122, and an example interface circuit 124. In the illustrated example, one or more input devices 102 are connected to the interface circuit 124. The input devices 102 permit a user to enter data and/or commands into the processor. One or more output devices 104 are also connected to the interface circuit 124 of the illustrated example.

The example main memory 120 of FIG. 1 includes an example process control block (PCB) 126. In some examples, the process control block 126 includes process information such as process identification numbers (PIDs) associated with instances of one or more applications. The example central processing unit 122 includes an example local memory 128, e.g., a cache.

The example host operating system 108 illustrated in FIG. 1 includes an example kernel 142. In some examples, the example kernel 142 communicates with the example main memory 120, example central processing unit (CPU) 122, and example interface circuit 124 of the example host hardware system 106. In some examples, the example kernel 142 behaves as an interface between the user and the system hardware and manages memory, processes and tasks, and/or disk space. In some examples, the example kernel 142 receives system calls or requests for service from processes.

In the illustrated example of FIG. 1, the example host operating system 108 communicates with the example host hardware system 106. In the illustrated example, the kernel 142 of the host operating system 108 has access to process information of applications instantiated in multiple containers running on the host operating system 108. Examples disclosed herein access such process information by executing command line commands in the kernel 142 as described below. For example, the example kernel 142 of the example host operating system 108 may access process information stored in the example main memory 120. In some examples, the example kernel 142 accesses process information stored in the process control block 126 of the example main memory 120.

In some examples, the process information includes process IDs associated with instances of one or more applications. In some examples, the example kernel 142 uses process information obtained from the example main memory 120 to manage memory, processes and tasks, and/or disk space. In some examples, the example kernel 142 receives system calls or requests for service from processes stored in the example main memory 120.

In some examples, the example container-based cloud computing environment 100 illustrated in FIG. 1 includes an example container engine 110. In some examples, the example container engine 110 is responsible for building and managing containers associated with one or more applications. In the illustrated example of FIG. 1, the example container engine 110 builds and manages a first example container 112, a second example container 114, and a third example container 116. In other examples, the example container engine 110 manages fewer or more than three containers. In some examples, the number of containers built and managed by the example container engine changes over time.

In the illustrated example of FIG. 1, the example container engine 110 communicates with the example host operating system 108 to access process information from the example process control block 126. In the illustrated example, the example container engine 110 uses the process information to build first example container 112, second example container 114, and third example container 116. In some examples, the container engine 110 receives process information from the process control block 126 via the example kernel 142.

In some examples, a container includes application code associated with a corresponding application. For example, as illustrated in the example of FIG. 1, the first example container 112 is associated with example application A and includes application code 144 specific to application A. The second example container 114 is associated with example application B and includes application code 146 specific to application B. The third example container 116 is associated with example application C and includes application code 148 specific to application C. In some examples, a container may be associated with more than one application. For example, a container may be associated with a first application and a second application and include application code specific to both the first and second applications.

In the illustrated example of FIG. 1, the first example container 112, the second example container 114, and the third example container 116 utilize an example host operating system 108 to execute the application code 144, 146, 148 included in the corresponding containers. In some examples, the containers share the same host operating system to execute the code included in the corresponding container.

In some examples, a container includes dependencies, such as binaries and libraries, specific to an application associated with container so that the application can run in an isolated fashion within that container without having to access resources outside the container. By packaging the application code and dependencies together, an example container-based cloud computing system offers a lightweight system for transporting and scaling applications.

In the illustrated example of FIG. 1, the first example container 112, the second example container 114, and the third example container 116 include libraries and binaries associated with the corresponding example applications. For example, the first example container 112 includes libraries and binaries 150 associated with corresponding example application A, the second example container 114 includes libraries and binaries 152 associated with corresponding example application B, and the third example container 116 includes libraries and binaries 154 associated with corresponding example application C. In some examples, one or more containers include dependencies such as files, variables, and/or any other dependencies necessary to execute the corresponding application. In some examples, a container may include dependencies associated with more than one application. For example, a container may include dependencies associated with a first application and a second application.

In some examples, a container runs one or more instances of an application. For example, in the illustrated example of FIG. 1, the example first container 112 runs one or more instances of example application A, the example second container 114 runs one or more instances of example application B, and the example third container 116 runs one or more instances of example application C. In some examples, a container may run instances of more than one application. For example, a container may run an instance of a first application and an instance of a second application.

In some examples, one or more instances are associated with a foreground application such as a gaming application, a browser application, or any other suitable foreground application that has memory regions associated with the one or more instances. In some examples, one or more instances are associated with a background application such as a compiler or any other suitable background application that has memory regions associated the one or more instances. In some examples, one or more instances are associated with any application or program that has memory regions associated with the one or more instances.

The example illustrated in FIG. 1 includes an example memory deduplicator 118. The example memory deduplicator 118 of FIG. 1 is implemented in the example kernel 142. In some examples, the memory deduplicator is implemented in hardware, in software (e.g., the operating system and/or the central processing unit), in firmware, or in a combination of hardware, software, and/or firmware.

The example memory deduplicator 118 illustrated in FIG. 1 includes an example data interface 130, an example parser 132, an example group generator 134, an example comparator 136, an example merge controller 138, and an example data structure generator 140. In the illustrated example, the example data interface 130, the example parser 132, the example group generator 134, the example comparator 136, the example merge controller 138, and the example data structure generator 140 are connected via a bus 141.

In the example illustrated in FIG. 1, the example memory deduplicator 118 detects and deduplicates identical memory regions of processes associated with instances of one or more applications based on process information associated with the processes. In some examples, the process information includes process IDs associated with instances of one or more applications. In some examples, the process information includes command lines associated with instances of one or more applications.

In some examples, the process information is accessed from the example main memory 120. In some examples, the process information is accessed from the example process control block 126 of the example main memory 120. In the example of FIG. 1, the example memory deduplicator 118 accesses process information from the example process control block 126. In some examples, the example data interface 130 of the example memory deduplicator 118 accesses process information from the process control block 126.

Examples disclosed herein access process information using command line commands that run at the kernel level to obtain process information that is accessible by the kernel 142. In some examples, a pseudo-filesystem, such as the Linux proc filesystem, is used to track process information and provides an interface to kernel data structures. In some examples, the example memory deduplicator 118 accesses process information using a process status for all (ps ax) command. In some examples, the example memory deduplicator 118 accesses process information simultaneously using a process status for all (ps ax) command.

In some examples, process information is accessed using a proc filesystem command such as proc/$pid/cmdline. In some examples, process information is accessed simultaneously using a proc filesystem command such as proc/$pid/cmdline. In some examples, a file/proc/$pid/cmdline is used to identify the command line associated with a process.

The example memory deduplicator 118 illustrated in FIG. 1 is thus application aware because it can access process information of instances associated with one or more applications and use the process information to group instances associated with the same application into corresponding application groups. By leveraging the assumption that processes associated with the same application are more likely to have duplicate memory regions than processes associated with different applications, the example memory deduplicator reduces memory consumption while conserving vital resources.

In the illustrated example of FIG. 1, an example parser 132 parses process information accessed from the example main memory 120, an example group generator 134 groups instances of one or more applications into application groups based on the process information, an example data structure generator 140 generates a pair of binary search trees for at least one application group, and an example merge controller 138 deduplicates identical memory content. In some examples, an example comparator 136 compares memory regions associated with instances of a corresponding application group to detect identical memory regions.

FIGS. 2A and 2B illustrate example commands for collecting process information. FIG. 2A is a screenshot showing the output of an example ps ax|grep apache2 command. In the illustrated example, grep (Globally search for a Regular Expression and Print matching lines) is a command-line utility for global searching of plain text. In this example, the example ps ax|grep apache2 command outputs the process IDs of processes having the application name "apache2" including its full directory path. As illustrated in example FIG. 2A, processes having PIDs 4225, 4226, and 4227 have the same application name "apache2" including the same full directory path (e.g., /usr/sbin/apache2).

FIG. 2B is an example screenshot showing the output of an example ps ax|grep apache2 command combined with an example cat /proc/$pid/cmdline command. As described above, the example ps ax|grep apache2 command outputs a listing of process IDs of instances corresponding to the same application name "apache2" including its full directory path. The example cat/proc/$pid/cmdline command parses the processes identified by the ps ax|grep apache2 command based on application name including the full directory path. As illustrated in example FIG. 2B, processes having PIDs 4225, 4226, and 4227 correspond to the same application name and same full directory path shown in "/usr/sbin/apache2-kstart".

In the examples illustrated in FIGS. 2A and 2B, each process ID is associated with an instance of an application. In this example, the instances associated with process IDs 4225, 4226, and 4227 are instances of the same application because they correspond to the same application name of "apache2" (shown in the command line grep search command of "grep apache2") including its full directory path "/usr/sbin/apache2". As such, it is assumed there is a higher probability that the instances associated with these three process IDs have duplicate memory regions.

Referring to FIG. 1, in some examples, the example data interface 130 accesses process information from the example process control block 126. In some examples, the example data interface 130 accesses process information from the example process control block 126 using a ps ax command. In some examples, the example parser 132 illustrated in FIG. 1 parses the process information accessed from the process control block 126. In some examples, the example parser 132 parses the process information using a proc filesystem command such as proc/$pid/cmdline. In some examples, the example group generator 134 illustrated in FIG. 1 groups processes associated with instances parsed using the same command line command into corresponding application groups.

Figure 3A:
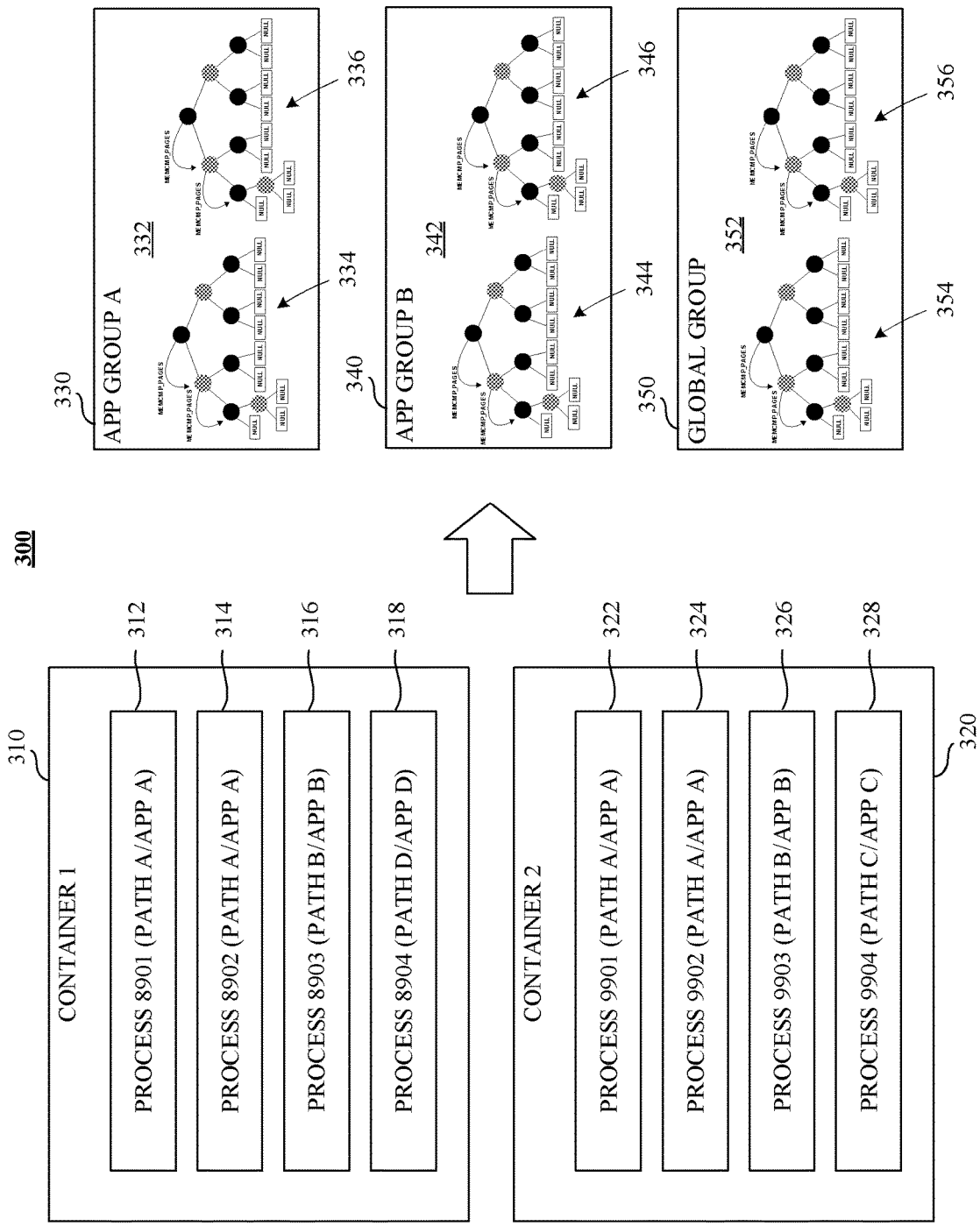
FIG. 3A illustrates application-bound binary search trees that can be generated using examples disclosed herein to represent memory regions allocated to multiple application instances.
Figure 3B:
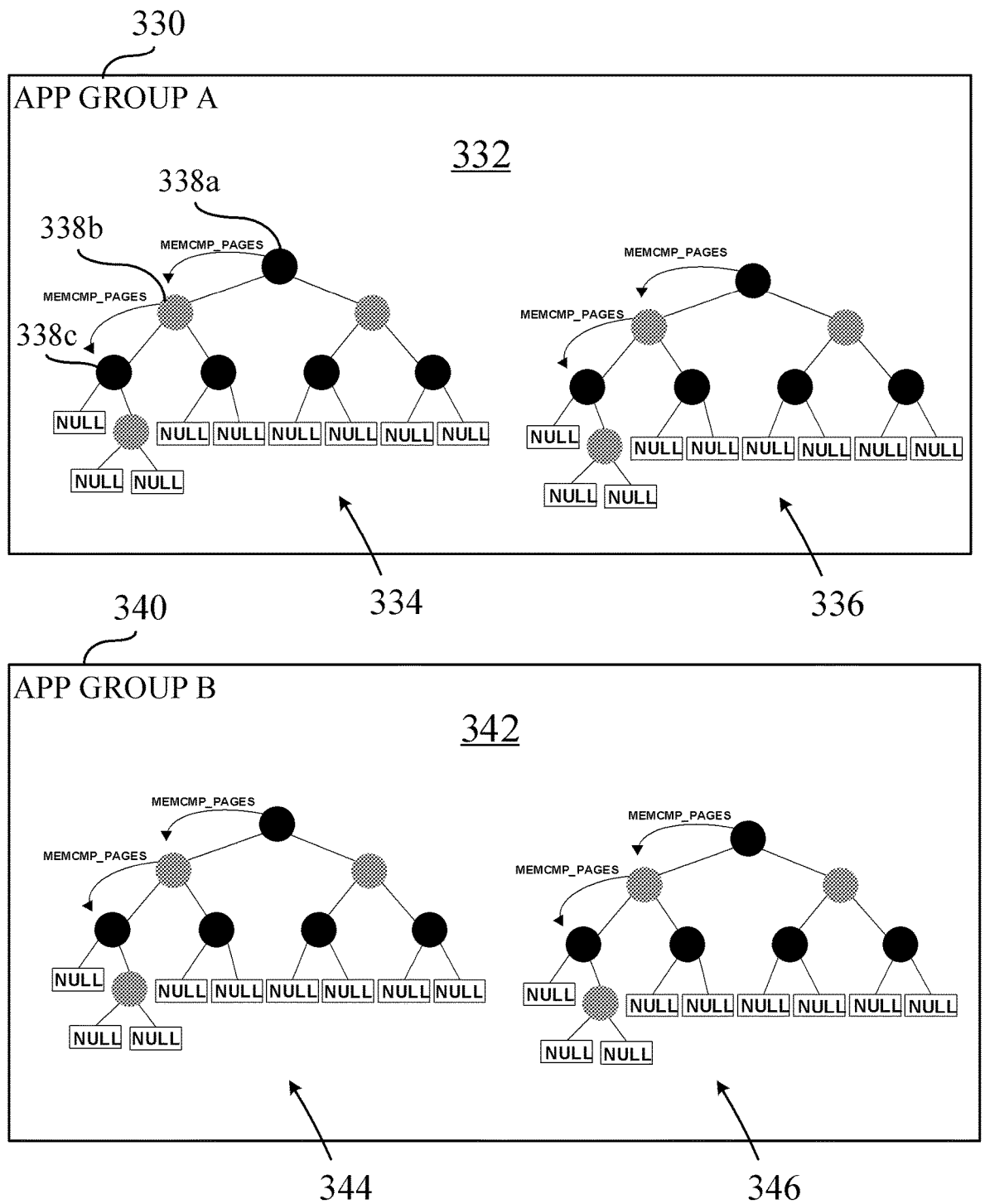
FIG. 3B is a magnified view of the example binary search trees of FIG. 3A.

FIG. 3A is a schematic representing a container-based cloud computing system 300 that illustrates application-bound binary search trees that can be generated using examples disclosed herein to represent memory regions allocated to multiple instances of an application. FIG. 3B is a magnified view of the example binary search trees of FIG. 3A.

In the example illustrated in FIG. 3A, an example first container 310 and an example second container 320 both include multiple processes associated with instances of a corresponding application. In some examples, the example container engine 110 illustrated in FIG. 1 builds and manages the example first container 310 and example second container 320.

For example, as illustrated in FIG. 3A, the example first container 310 includes example process 8901 (/path A/App A) 312 (e.g., a process associated with process ID 8901) associated with example application A, example process 8902 (/path A/App A) 314 associated with example application A, example process 8903 (/path B/App B) 316 associated with example application B, and example process 8904 (/path D/App D) 318 associated with corresponding example application D.

The example second container 320 illustrated in FIG. 3A includes example process 9901 (/path A/App A) 322 (e.g., a process associated with process ID 9901) associated with example application A, example process 9902 (/path A/App A) 324 associated with example application A, example process 9903 (/path B/App B) 326 associated with example application B, and example process 9904 (/path C/App C) 328 associated with example application C.

Thus, between the example first container 310 and the example second container 320, there are four instances of example application A, two instances of example application B, one instance of example application C, and one instance of example application D.

The example of FIG. 3A relies on the assumption that two instances associated with the same application are more likely to have duplicate memory regions than two instances associated with different applications. Thus, in the example of FIG. 3A, an example parser 132 (FIG. 1) parses the process information associated with the example first container 310 and the example second container 320, an example group generator 134 (FIG. 1) groups instances associated with the same application into corresponding example application groups, an example data structure generator 140 (FIG. 1) builds and maintains an example pair of binary search trees for at least one group, and an example merge controller 138 (FIG. 1) deduplicates identical memory regions detected within the example application groups.

The example illustrated in FIG. 3A is application-aware because it involves parsing process information and determining which application a process is associated with. For example, in the example of FIG. 3A, an example parser 132 (FIG. 1) parses the process information of the first example container 310 and the second example container 320. In the example of FIG. 3A, parsing process information includes determining which application a process is instantiated from. In some examples, the parser determines which application a process is instantiated from using a ps ax|cat proc/$pid/cmdline command. As illustrated in the example of FIG. 3A, instances of processes from the same application could be instantiated across multiple containers or within the same container.

In some examples, an example group generator 134 (FIG. 1) groups together processes instantiated from the same application. In the example of FIG. 3A, the example group generator 134 groups the example processes associated with example application A, i.e., example process 8901 (/path A/App A) 312, example process 8902 (/path A/App A) 314, example process 9901 (/path A/App A) 322, and example process 9902 (/path A/App A) 324, into corresponding example application group A 330. The example group generator groups the example processes associated with example application B, i.e., example process 8903 (/path B/App B) 316 and example process 9903 (/path B/App B) 326, into corresponding example application group B 340. The example group generator 134 groups the example processes associated with applications having only one instance, i.e., example process 8904 (/path D/App D) 318 associated with example application D and example process 9904 (/path C/App C) 318 associated with example application C, into an example global group 350.

In some examples, a pair of binary search trees is generated for at least one group. In some examples, the example group generator 134 (FIG. 1) generates a pair of binary search trees for at least one group. For example, in the example of FIG. 3A, an example data structure generator 140 (FIG. 1) generates an example pair of binary search trees 332 for example application group A 330, an example pair of binary search trees 342 for example application group B 340, and an example pair of binary search trees 352 for an example global group 350. Examples disclosed herein can be used to analyze the processes of example application group A 330 and example application group B 340 using A-KSM, as disclosed herein, to identify opportunities to deduplicate same memory pages in heap memory. This is based on the increased likelihood that multiple instances of the same application in a container-based cloud computing environment have the same contents in respective memory pages. However, in some examples, the processes of the example global group 350 can be analyzed using prior techniques (e.g., KSM, UKSM, KSM++, SmartMD, etc.) to deduplicate same memory pages because the global group 350 corresponds to applications having only a single instance.

In some examples, one or both binary search trees in an example pair of binary search trees are red-black trees. In some examples, the red-black trees are dedicated red-black trees. In the illustrated example of FIG. 3A, both a first binary search tree 334 and a second binary search tree 336 of the pair of binary search trees 332 are red-black trees, both a first binary search tree 344 and a second binary search tree 346 in the pair of binary search trees 342 are red-black trees, and both a first binary search tree 354 and a second binary search tree 356 of the pair of binary search trees 352 are red-black trees.

FIG. 3B is a magnified view of the example pair of binary search trees 332 and example pair of binary search trees 342 illustrated in FIG. 3A. In some examples, the binary search trees include nodes, the nodes including address pointers to memory regions associated with instances of a corresponding application. In some examples, the memory regions associated with instances of a corresponding application include memory pages.

For example, in the example illustrated in FIG. 3B, the first binary search tree 334 of the pair of binary search trees 332 includes example nodes 338*a*, 338*b*, and 338*c*, the nodes including address pointers to memory regions associated with instances of example application A. In some examples, nodes are inserted into the red-black trees following a traditional KSM algorithm.

In some examples, a first binary search tree in a pair of binary search trees is stable and a second binary search tree in the pair of binary search trees is unstable. In examples disclosed herein, the nodes of the stable binary search tree include pointers to memory regions that have been deduplicated. In examples disclosed herein, the nodes of the unstable search tree include pointers to memory pages that have been unchanged for a period of time, e.g., memory pages for which duplicate memory contents have not yet been detected.

In some examples, a first checksum is calculated and stored for a memory region at a first point in time and a second checksum is calculated for the memory page at a second point in time. In some examples, the first checksum and second checksum are compared to determine whether the memory region was changed between the first point in time and the second point in time. The checksums may be 32-bit checksums or any other suitable size.

In some examples, the example kernel 142 (FIG. 1) determines whether a memory region has been changed over a period of time by calculating and comparing checksums for a memory region. In some examples, the kernel 142 calculates and stores a first checksum for a memory region at a first point in time and a second checksum for the memory region at a second point in time. In some examples, the kernel 142 compares the first checksum to the second checksum to determine whether the memory region was changed between the first point in time and the second point in time.

If the first checksum and second checksum match, the kernel 142 determines that the memory region was not changed between the first point in time and the second point in time. If the first checksum and second checksum do not match, the kernel 142 determines that the memory region has been changed between the first point in time and the second point in time, e.g., the memory region has been deduplicated. In some examples, the first point in time corresponds to a first scan of the memory region and the second point in time corresponds to a second scan of the memory region.

In some examples, if the memory region has been changed, the node associated with memory region is removed from the unstable tree and inserted into the stable tree. For example, in some examples, if the kernel 142 determines that the first checksum and second checksum do not match, an example data structure generator 140 (FIG. 1) removes the node associated with the deduplicated memory region from the unstable tree and adds the node to the corresponding stable tree.

In some examples, the unstable tree is periodically rebuilt. In some examples, the kernel 142 illustrated in FIG. 1 periodically rebuilds the unstable tree. In some examples, the data structure generator 140 illustrated in FIG. 1 periodically rebuilds the unstable tree. In some examples, the example unstable tree is rebuilt using the checksum method described above. In some examples, the data structure generator 140 flushes and rebuilds the unstable tree when an example merge controller completes scanning the unstable binary search tree.

In some examples, data of memory regions associated with neighboring nodes in a binary search tree is compared to determine whether the data of the memory regions is identical. In some examples, the example comparator 136 of FIG. 1 compares the data of memory regions associated with neighboring nodes to determine whether the data of the memory regions is identical. For example, as shown in FIG. 3B, data stored in an example memory region associated with example node 338*a* of binary search tree 332 is compared to data stored in an example memory region associated with example node 338*b* of binary search tree 332. In the example illustrated in FIG. 3B, the data associated with example neighboring nodes 338a and 338b is compared using a memcmp_pages function.

In some examples, the comparator 136 (FIG. 1) compares data stored in memory regions associated with neighboring nodes in a binary search tree until the comparator 136 detects duplicate memory regions or determines one of the nodes includes a NULL character. In some examples, when comparing memory contents between two memory pages, the comparator 136 compares all the data of the two memory pages when the memory pages are duplicates. For example, for 4 KB (four kilobytes) memory pages, the comparator 136 compares all 4 KB of contents between the two memory pages when they are exact duplicates because the comparator 136 performs its comparison routine until it detects a difference between the two memory pages. However, when two memory pages being compared are not duplicates, the example comparator 136 stops the comparison process upon encountering one different bit between the memory pages (e.g., without comparing all 4 KB of memory contents).

In the example of FIG. 3A, if the comparator 136 (FIG. 1) detects duplicate memory contents, the merge controller 138 (FIG. 1) deduplicates the duplicate memory contents. In some examples, the merge controller 138 deduplicates duplicate memory contents by configuring a first instance of a corresponding application to access a second memory region allocated to a second instance of the corresponding application and deallocating a first memory region corresponding to the first instance. For example, the merge controller 138 may update one or more of the address pointers of the first one of the first instances to reference the second memory region corresponding to the second one of the first instances.

Figure 4:
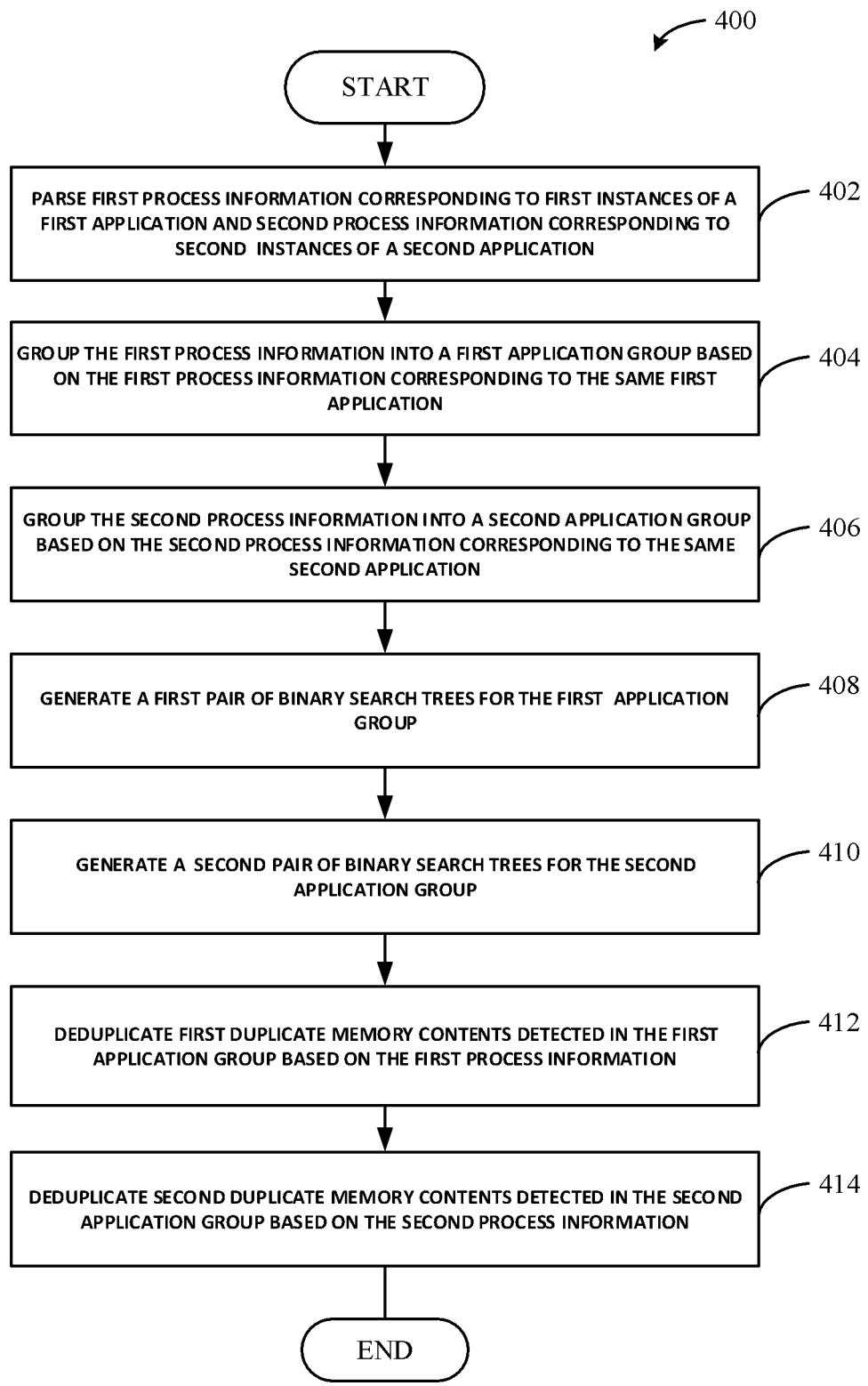
FIG. 4 is a flowchart representative of machine readable instructions which may be executed to implement the memory deduplicator of FIG. 1 to deduplicate memory in a cloud computing environment.
Figure 5:
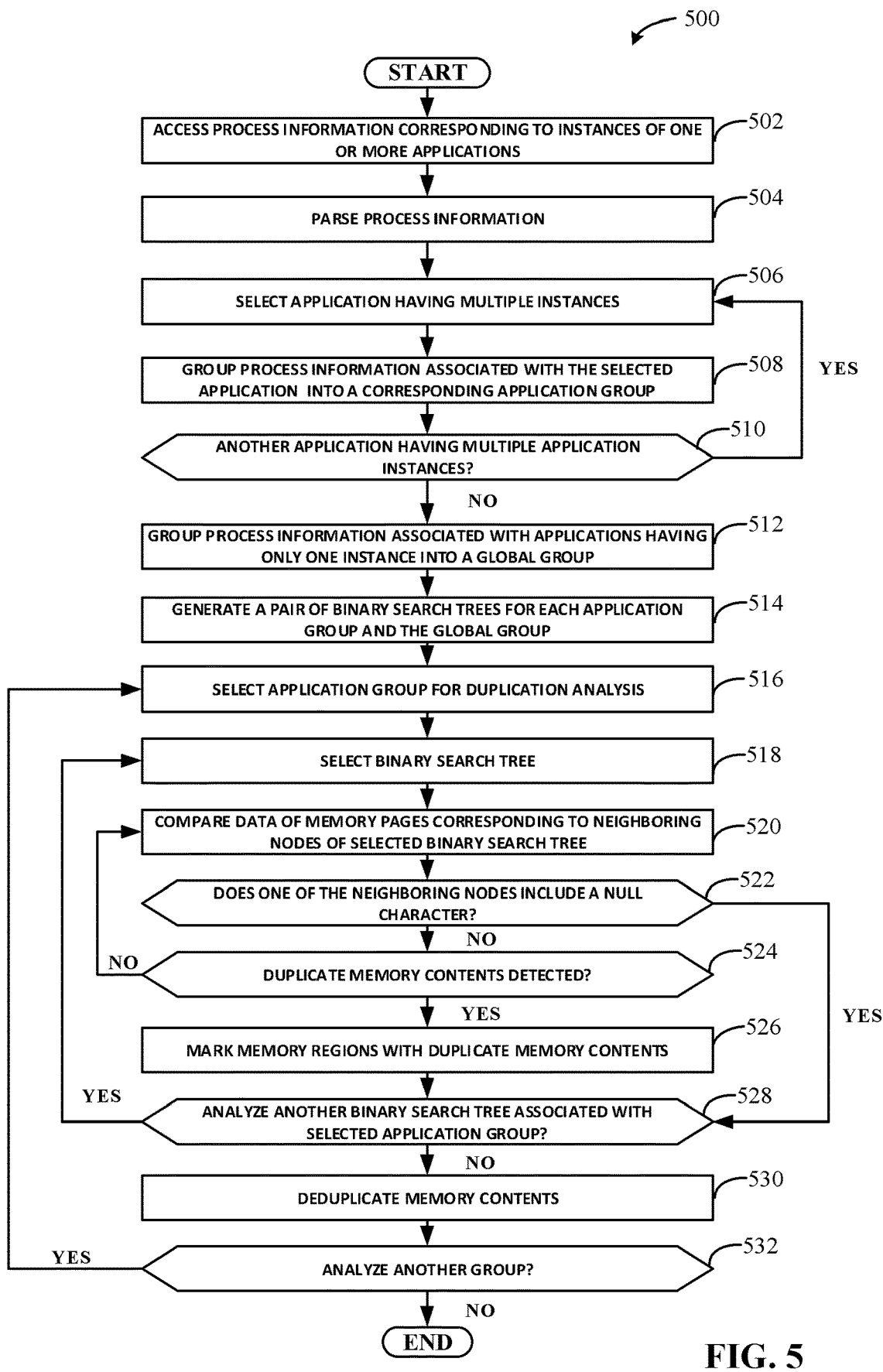
FIG. 5 is another flowchart representative of machine readable instructions which may be executed to implement the memory deduplicator of FIG. 1 to deduplicate memory in a cloud computing environment.
Figure 6:
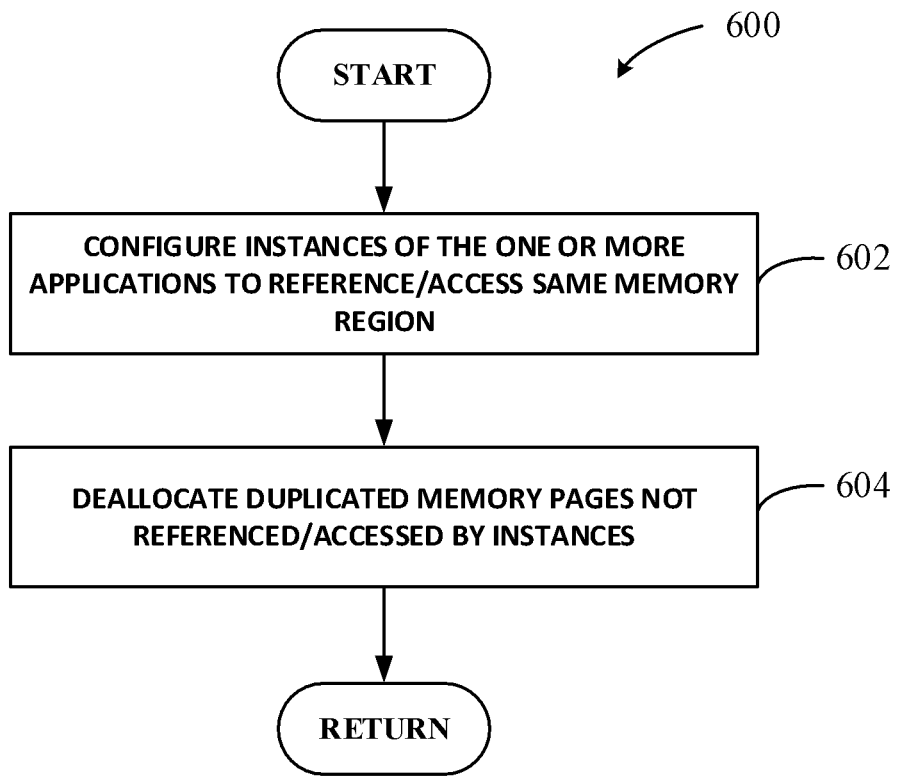
FIG. 6 is a flowchart representative of machine readable instructions which may be executed to implement the memory deduplication of FIG. 5.

While an example manner of implementing the deduplication method of FIGS. 4-6 is illustrated in FIG. 1, one or more of the elements, processes and/or devices illustrated in FIG. 1 may be combined, divided, re-arranged, omitted, eliminated and/or implemented in any other way. Further, the example data interface 130, the example parser 132, the example group generator 134, the example comparator 136, the example merge controller 138, the example data structure generator 140 of FIG. 1, and/or, more generally, the example memory deduplication method of FIGS. 4-6 may be implemented by hardware, software, firmware and/or any combination of hardware, software and/or firmware. Thus, for example, any of the example data interface 130, the example parser 132, the example group generator 134, the example comparator 136, the example merge controller 138, the example data structure generator 140 of FIG. 1 and/or, more generally, the example memory deduplication method could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 130, the example parser 132, the example group generator 134, the example comparator 136, the example merge controller 138, and/or the example data structure generator 140 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example memory deduplication method of FIGS. 4-6 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the apparatus of FIG. 1 are shown in FIGS. 4-6. The machine readable instructions may be one or more executable programs or portion(s) of an executable program for execution by a computer processor and/or processor circuitry, such as the processor 712 shown in the example processor platform 700 discussed below in connection with FIG. 1. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4-6, many other methods of implementing the example memory deduplicator 118 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions that may be executed to implement the example memory deduplicator 118 of FIG. 1 to deduplicate memory in a cloud computing environment.

The machine readable instructions 400 of FIG. 4 begin at block 402 where example parser 132 (FIG. 1) parses first process information corresponding to first instances of a first application and second process information corresponding to second instances of a second application. In some examples, the process information includes process IDs corresponding to the first instances of the first application and the second instances of the second application. In some examples, the parser 132 parses the process information based on a command line command (e.g., the Unix command ps ax cat proc/$pid/cmdline).

At block 404, the example group generator 134 (FIG. 1) groups the first process information into a first application group based on the first process information corresponding to the same first application. For example, the group generator 134 may group first process information associated with an example application A into an example application group A. In the illustrated example, the group generator 134 groups the first process information into the first application group based on the process information indicating instances of the first application corresponding to the same application name including its full directory path (e.g., /usr/sbin/app1).

At block 406, the example group generator 134 groups the second process information into a second application group based on the second process information corresponding to the same second application. For example, the example group generator 134 may group second process information associated with an example application B into an example application group B. In the illustrated example, the group generator 134 groups the second process information into the second application group based on the process information indicating instances of the second application corresponding to the same application name including its full directory path (e.g., /usr/sbin/app2).

At block 408, the example data structure generator 140 (FIG. 1) generates a first pair of binary search trees for the first application group. For example, the data structure generator 140 may generate a pair of binary search trees for the example application group A. In some examples, the first pair of binary search trees includes nodes. The nodes include address pointers to memory regions for corresponding ones of the first instances of the first application. In some examples, the memory regions include memory pages.

For example, a pair of binary search trees associated with example application group A may include nodes that include address pointers to memory pages corresponding to instances of example application A. In some examples, the first pair of binary search trees are red-black trees. In some examples, the nodes are inserted into the red-black trees following the traditional KSM algorithm.

In some examples, a first binary search tree of the first pair of binary search trees is stable and a second binary search tree of the first pair of binary search trees is unstable. In some examples, the stable binary search tree of the first pair of binary search trees includes pointers to memory pages that have been deduplicated. In some examples, the unstable binary search tree of the first pair of binary search trees includes pointers to memory pages that have been unchanged for a period of time, e.g., memory pages for which duplicate memory contents have not yet been detected.

In some examples, an example data structure generator 140 periodically rebuilds the unstable search tree of the first pair of binary search trees. In some examples, the example data structure generator 140 rebuilds the unstable binary search tree of the first pair of binary search trees by periodically scanning the unstable binary search tree to determine if any pages have been changed, and, if the example data structure generator 140 detects that a memory page has been changed, the example data structure generator 140 removes the changed memory page from the unstable binary search tree and inserts it into the corresponding stable binary search tree.

At block 410, the example data structure generator 140 generates a second pair of binary search trees for the second application group. For example, the data structure generator 140 may generate a pair of binary search trees for an example application group B. In some examples, the second pair of binary search trees include nodes that include address pointers to memory regions for corresponding ones of the second instances of the second application. In some examples, the memory regions associated with instances of a corresponding application include memory pages.

For example, a pair of binary search trees associated with example application group B may include nodes that include address pointers to memory regions corresponding to instances of example application B. In some examples, the second pair of binary search trees are red-black trees. In some examples, the nodes are inserted into the red-black trees following the traditional KSM algorithm.

In some examples, a first binary search tree in the second pair of binary search trees is stable and a second binary search tree in the second pair of binary search trees is unstable. In some examples, the stable binary search tree of the second pair of binary search trees includes pointers to memory regions that have been deduplicated. In some examples, the unstable binary search tree of the second pair of binary search trees includes pointers to memory regions that have been unchanged for a period of time, e.g., memory pages in which duplicate memory contents have not yet been detected.

In some examples, the e data structure generator 140 periodically rebuilds the unstable search tree of the second pair of binary search trees. In some examples, the data structure generator 140 rebuilds the unstable binary search tree of the second pair of binary search trees by periodically scanning the unstable binary search tree to determine if any memory regions have been changed, and, if the example data structure generator 140 detects that a memory region has been changed, the example data structure generator 140 removes the changed memory region from the unstable binary search tree and inserts it into the corresponding stable binary search tree.

At block 412, the example merge controller 138 (FIG. 1) deduplicates first duplicate memory contents detected in the first application group based on the first process information. For example, the merge controller 138 may deduplicate first duplicate memory contents detected in example application group A. In some examples, the merge controller 138 deduplicates first duplicate memory contents detected in the first application group by configuring a first one of the first instances associated with the first application to access a second memory region allocated to a second one of the first instances and deallocating a first memory region corresponding to the first one of the first instances. For example, the merge controller 138 may update one or more of the address pointers of the first one of the first instances to reference the second memory region corresponding to the second one of the first instances.

In some examples, the example comparator 136 (FIG. 1) detects first duplicate memory contents by scanning the first binary search tree and second binary search tree in the first pair of binary search trees. In some examples, the comparator 136 scans the first binary search tree and second binary search tree of the first pair of binary search trees by comparing data associated with neighboring nodes in the first binary search tree and second binary search tree. In some examples, the comparator 136 compares data associated with neighboring nodes using an memcmp_pages function.

In some examples, the comparator 136 compares a first memory region associated with a first node of the first binary search tree in the first pair of binary search trees to a second memory region associated with a second node of the first binary search tree in the first pair of binary search trees. In some examples, the comparator 136 compares first data of the first memory region associated with the first node of the first binary search tree to second data of the second memory region associated with the second node of the first binary search tree. In some examples, the comparator 136 compares data associated with neighboring nodes using a memcmp_pages function.

In some examples, the comparator 136 compares a first memory region associated with a first node of the second binary search tree in the first pair of binary search trees to a second memory region associated with a second node of the second binary search tree in the first pair of binary search trees. In some examples, the merge controller 138 compares first data of the first memory region associated with the first node of the second binary search tree to second data of the second memory region associated with the second node of the second binary search tree. In some examples, the merge controller 138 compares data associated with neighboring nodes using an memcmp_pages function.

At block 414, the merge controller 138 deduplicates second duplicate memory contents detected in the second application group based on the second process information. For example, the merge controller 138 may deduplicate second duplicate memory contents detected in example application group B. In some examples, the merge controller 138 deduplicates second duplicate memory contents detected in the first application group by configuring a first one of the second instances associated with the second application to access a second memory region allocated to a second one of the second instances and deallocating a first memory region corresponding to the first one of the second instances.

In some examples, the comparator 136 detects second duplicate memory contents by scanning the first binary search tree and second binary search tree of the second pair of binary search trees. In some examples, the comparator 136 scans the first binary search tree and the second binary search tree of the second pair of binary search trees by comparing data associated with neighboring nodes in the first binary search tree and second binary search tree. In some examples, the comparator 136 compares data associated with neighboring nodes using a memcmp_pages function.

In some examples, the comparator 136 compares a first memory region associated with a first node of the first binary search tree in the second pair of binary search trees to a second memory region associated with a second node of the first binary search tree in the second pair of binary search trees. In some examples, the comparator 136 compares first data of the first memory region associated with the first node of the first binary search tree to second data of the second memory region associated with the second node of the first binary search tree. In some examples, the comparator 136 compares data associated with neighboring nodes using a memcmp_pages function.

In some examples, the comparator 136 compares a first memory region associated with a first node of the second binary search tree in the pair of binary search trees to a second memory region associated with a second node of the second binary search tree in the second pair of binary search trees. In some examples, the comparator 136 compares first data of the first memory region associated with the first node of the second binary search tree to second data of the second memory region associated with the second node of the second binary search tree. In some examples, the comparator 136 compares data associated with neighboring nodes using a memcmp_pages function.

FIG. 5 is a flowchart representative of example machine readable instructions which may be executed to deduplicate memory in a cloud computing environment. The example machine readable instructions 500 illustrated in FIG. 5 begin at block 502 where the example data interface 130 (FIG. 1) accesses process information corresponding to instances of one or more applications. In some examples, the data interface 130 accesses the process information from an example host hardware, an example main memory in the example host hardware, and/or an example process control block in the example main memory. In some examples, the data interface 130 accesses the process information via an example kernel 142 (FIG. 1). In some examples, the process information includes process ID's associated with the instances of the one or more applications.

At block 504, the parser 132 (FIG. 1) parses the accessed process information. In some examples, parsing the accessed process information includes determining which application an instance is instantiated from. In some examples, the example parser determines which application an instance is instantiated from by reading the execution path of the associated process. In some examples, the parser 132 determines which application an instance is instantiated from based on a command line command (e.g., the Unix command a ps ax|cat proc/$pid/cmdline).

At block 506, the parser 132 (FIG. 1) selects one of the one or more applications having multiple instances. At block 508, the group generator 134 (FIG. 1) groups process information associated with the selected application into a corresponding application group. In the illustrated example, the group generator 134 groups the process information into an application group based on the process information indicating instances of the selected application corresponding to the same application name including its full directory path (e.g., /usr/sbin/appname).

At block 510, the parser 132 (FIG. 1) determines whether there is another application having multiple instances. If the parser 132 determines there is another application having multiple instances, the parser 132 selects the application at block 506 and repeats the instructions of blocks 508 and 510 for the selected application.

If the parser 132 (FIG. 1) determines there is not another application having multiple instances at block 510, the group generator 134 groups process information associated with applications having only one instance into a global group at block 512.

At block 514, the data structure generator 140 (FIG. 1) generates a pair of binary search trees for at least one application group and the global group. At block 516, the comparator 136 (FIG. 1) selects an application group for duplication analysis. At block 518, the comparator 136 selects one of the binary search trees in the pair of binary search trees associated with the selected application group for scanning. At block 520, the comparator 136 compares the data of memory regions corresponding to neighboring nodes of the selected binary search tree. In some examples, the memory regions are memory pages such that the comparator 136 compares a page of one node to another page of a neighboring node.

At block 522, the comparator 136 (FIG. 1) determines whether one of the neighboring nodes includes a NULL character. If the comparator 136 determines one of the neighboring nodes includes a NULL character at block 522, the comparator 136 proceeds to block 528 to determine whether there is another binary search tree to analyze. If the comparator 136 determines that neither of the neighboring nodes include a NULL character at block 522, the comparator 136 proceeds to block 524 to determine whether the contents of the memory regions corresponding to the neighboring nodes are duplicates of one another (e.g., identical).

If at block 524, the comparator 136 (FIG. 1) determines that the memory regions are not identical, the comparator 136 returns to the instructions of block 520 to compare another pair of neighboring nodes. If at block 524 the comparator 136 determines that the memory pages are duplicates (e.g., identical), the comparator 136 marks the memory pages having identical memory contents at block 526.

At block 528, the comparator 136 (FIG. 1) determines whether there is another binary search tree associated with the selected application group to analyze. If the comparator 136 determines at block 528 that there is another binary search tree associated with the selected application group to analyze, the comparator 136 returns to the instructions of block 518, selects the next binary search tree, and performs the instructions of blocks 520-526 for the next binary search tree. If the comparator 136 determines at block 528 that there is not another binary search tree associated with the selected application group to analyze, the merge controller 138 (FIG. 1) deduplicates the marked memory contents at block 530. Example instructions that may be used to implement block 530 are described below in connection with FIG. 6.

At block 532, the merge controller 138 (FIG. 1) determines whether there is another group to analyze. If at block 532 the merge controller 138 determines there is another group to analyze, the merge controller 138 returns to block 516, selects another application group for duplication analysis, and performs the instructions of blocks 518-530 for the selected application group. If at block 532 the merge controller 138 determines that there are no more groups to analyze, the machine readable instructions 500 are terminated.

FIG. 6 is a flowchart representative of example machine readable instructions which may be executed to implement the deduplication of memory contents of FIG. 5. The example instructions of FIG. 6 may be used to implement block 530 of FIG. 5. The machine readable instructions 600 illustrated in FIG. 6 begin at block 602 where the example merge controller 138 (FIG. 1) configures instances of the one or more applications with duplicate memory contents to reference and/or access the same memory region. At block 604, the merge controller 138 deallocates memory regions not accessed/referenced by instances of the one or more applications. The example instructions of FIG. 6 end, and control returns to a calling function or instructions such as the instructions of FIG. 5.

Figure 7:
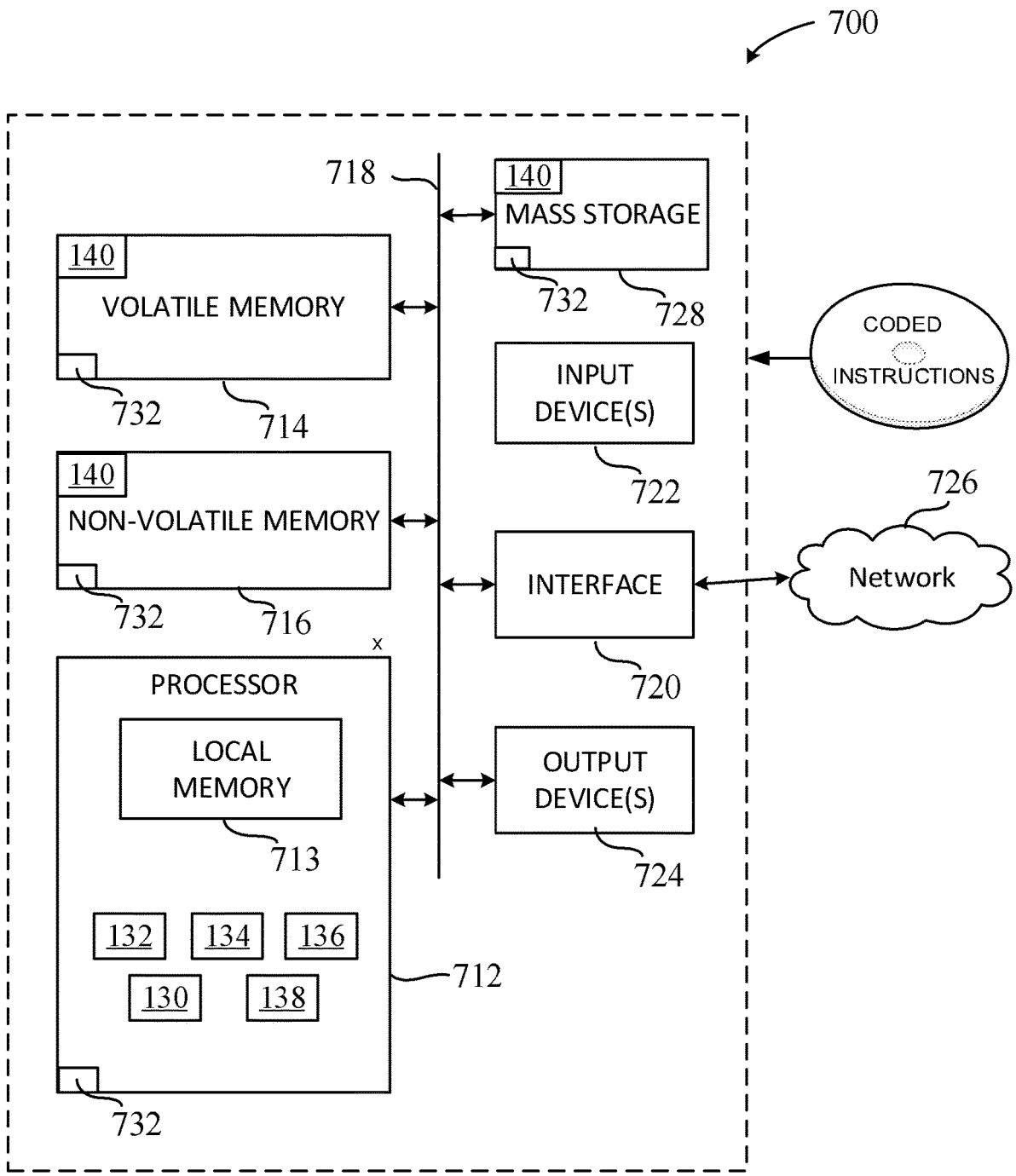
FIG. 7 is a block diagram of an example processing platform structured to execute the instructions of FIGS. 4-6 to implement the example memory deduplicator of FIG. 1.

FIG. 7 is a block diagram of an example processor platform 700 structured to execute the instructions of FIGS. 4-6 to implement the example memory deduplicator 118 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a Blu-ray player, a gaming console, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the data interface 130, the parser 132, the group generator 134, the comparator 136, and the merge controller 138 of the memory deduplicator 118.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

In examples disclosed herein, the data structure generator 140 of the memory deduplicator 118 may be implemented in one or more of the volatile memory 714, non-volatile memory 716, and/or the mass storage 728. In addition, the machine executable instructions 732 represented in FIGS. 4-6 may be stored in the mass storage device 728, in the volatile memory 714, in the non-volatile memory 716, and/or on a removable non-transitory computer readable storage medium such as a CD or DVD.

Figure 8:
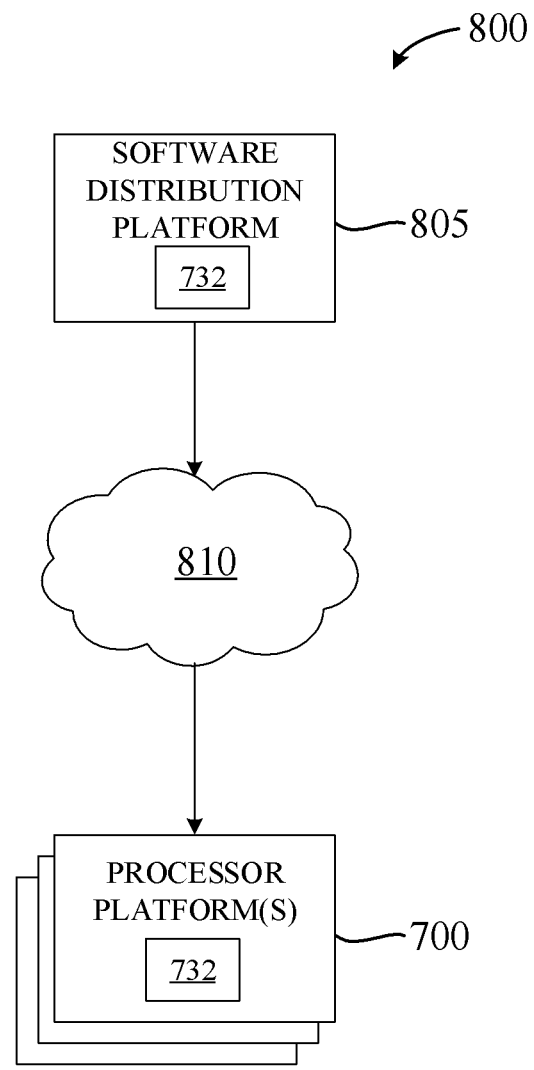
FIG. 8 is a block diagram of an example software distribution platform to distribute software (e.g., software corresponding to the example computer readable instructions of FIGS. 4-6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution system 800 including an example software distribution platform 805 to distribute software such as the example computer readable instructions 732 of FIGS. 4-6 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIGS. 4-6. The third parties may be consumers, users, retailers, OEMs, etc., who purchase and/or license the software for use and/or re-sale and/or sub-licensing. In the illustrated example, example the software distribution platform 805 includes one or more servers and one or more storage devices. The storage devices store the computer readable instructions 732, which may correspond to the example computer readable instructions 732 of FIGS. 4-6, as described above. The one or more servers of the example software distribution platform 805 are in communication with an example network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the example software distribution platform 805. For example, the software, which may correspond to the example computer readable instructions 732 of FIGS. 4-6, may be downloaded to the example processor platform 700, which is to execute the computer readable instructions 732 to implement the memory deduplicator. In some examples, one or more servers of the example software distribution platform 805 periodically offer, transmit, and/or force updates to the software (e.g., the example computer readable instructions 732 of FIGS. 4-6) to ensure improvements, patches, updates, etc. are distributed and applied to the software at the end user devices.

In some examples, an apparatus to deduplicate duplicate memory comprises a parser to parse first process information corresponding to first instances of a first application and second process information corresponding to second instances of a second application; a group generator to group the first process information into a first application group based on the first process information indicating the first instances correspond to a same first directory path and first application name and group the second process information into a second application group based on the second process information indicating the second instances correspond to a same second directory path and second application name; a data structure generator to generate a first pair of binary search trees based on the first process information for the first application group and a second pair of binary search trees based on the second process information for the second application group; and a merge controller to deduplicate first duplicate memory contents detected in the first application group based on the first process information and deduplicate second duplicate memory contents detected in the second application group based on the second process information.

In some examples, the apparatus further includes a comparator to detect the first duplicate memory contents by comparing first data of a first memory region associated with a first one of the first instances of the first application to second data of a second memory region associated with a second one of the first instances of the first application.

In some examples, the first process information includes process identification numbers associated with the first instances of the first application. In some examples, the apparatus further includes a data interface to access the first process information and the second process information concurrently using a command line command. In some examples, the command line command is a grep command.

In some examples, the first pair of binary search trees includes nodes, the nodes including address pointers to memory regions for corresponding ones of the first instances of the first application.

In some examples, the apparatus further includes a comparator to detect the first duplicate memory contents by comparing first data of a first one of the memory regions to second data of a second one of the memory regions.

In some examples, the first pair of binary search trees is a pair of red-black trees. In some examples, the first pair of binary search trees includes a stable tree and an unstable tree, the stable tree representative of deduplicated memory regions, the unstable tree representative of memory regions that have been unchanged for a period of time.

In some examples, the merge controller deduplicates the first memory contents by configuring a first one of the first instances of the first application to access a second memory region allocated to a second one of the first instances of the first application and deallocating a first memory region corresponding to the first one of the first instances of the first application.

In some examples, a non-transitory computer readable medium comprises computer readable instructions that, when executed, cause at least one processor to at least parse first process information corresponding to first instances of a first application and second process information corresponding to second instances of a second application; group the first process information into a first application group based on the first process information indicating the first instances correspond to a same first directory path and first application name; group the second process information into a second application group based on the second process information indicating the second instances correspond to a same second directory path and second application name; generate a first pair of binary search trees for the first application group based on the first process information and a second pair of binary search trees for the second application group based on the second process information; deduplicate first duplicate memory contents detected in the first application group based on the first process information; and deduplicate second duplicate memory contents detected in the second application group based on the second process information.

In some examples, the computer readable instructions are further to cause the at least one processor to at least detect the first duplicate memory contents by comparing first data of a first memory region associated with a first one of the first instances of the first application to second data of a second memory region associated with a second one of the first instances of the first application.

In some examples, the first process information includes process identification numbers associated with the first instances of the first application. In some examples, the computer readable instructions are further to cause the at least one processor to access the first process information and the second process information concurrently using a command line command. In some examples, the command line command is a grep command.

In some examples, the first pair of binary search trees includes nodes, the nodes including address pointers to memory regions for corresponding ones of the first instances of the first application.

In some examples, the computer readable instructions are further to cause the at least one processor to at least detect the first duplicate memory contents by comparing first data of a first one of the memory regions to second data of a second one of the memory regions.

In some examples, the first pair of binary search trees is a pair of red-black trees. In some examples, the first pair of binary search trees includes a stable tree and an unstable tree, the stable tree representative of deduplicated memory regions, the unstable tree representative of memory regions that have been unchanged for a period of time.

In some examples, the computer readable instructions are further to cause the at least one processor to at least configure a first one of the first instances of the first application to access a second memory region allocated to a second one of the first instances of the first application and deallocate a first memory region corresponding to the first one of the first instances of the first application.

In some examples, an apparatus to deduplicate duplicate memory comprises means for parsing first process information corresponding to first instances of a first application and second process information corresponding to second instances of a second application; means for grouping the first process information into a first application group based on the first process information indicating the first instances correspond to a same first directory path and first application name; means for grouping the second process information into a second application group based on the second process information indicating the second instances correspond to a same second directory path and second application name; means for generating data structures to generate a first pair of binary search trees for the first application group based on the first process information and a second pair of binary search trees for the second application group based on the second process information; and means for merging to deduplicate first duplicate memory contents detected in the first application group based on the first process information and deduplicate second duplicate memory contents detected in the second application group based on the second process information.

In some examples, the apparatus includes means for comparing first data of a first memory region associated with a first one of the first instances of the first application to second data of a second memory region associated with a second one of the first instances of the first application.

In some examples, the first process information includes process identification numbers associated with the first instances of the first application. In some examples, the apparatus further includes means for accessing the first process information and the second process information concurrently using a command line command. In some examples, the command line command is a grep command.

In some examples, the first pair of binary search trees includes nodes, the nodes including address pointers to memory regions for corresponding ones of the first instances of the first application. In some examples, the apparatus further includes means for detecting the first duplicate memory contents by comparing first data of a first one of the memory regions to second data of a second one of the memory regions.

In some examples, the first pair of binary search trees is a pair of red-black trees. In some examples, the first pair of binary search trees includes a stable tree and an unstable tree, the stable tree representative of deduplicated memory regions, the unstable tree representative of memory regions that have been unchanged for a period of time.

In some examples, the means for merging is to deduplicate the first memory contents by configuring a first one of the first instances of the first application to access a second memory region allocated to a second one of the first instances of the first application and deallocating a first memory region corresponding to the first one of the first instances of the first application.

In some examples, a method to deduplicate duplicate memory comprises parsing first process information corresponding to first instances of a first application and second process information corresponding to second instances of a second application; grouping the first process information into a first application group based on the first process information indicating the first instances correspond to a same first directory path and first application name; grouping the second process information into a second application group based on the second process information indicating the second instances correspond to a same second directory path and second application name; generating a first pair of binary search trees for the first application group based on the first process information and a second pair of binary search trees for the second application group based on the second process information; deduplicating first duplicate memory contents detected in the first application group based on the first process information; and deduplicating second duplicate memory contents detected in the second application group based on the second process information.

In some examples, the method further includes comparing first data of a first memory region associated with a first one of the first instances of the first application to second data of a second memory region associated with a second one of the first instances of the first application.

In some examples, the first process information includes process identification numbers associated with the first instances of the first application. In some examples, the first process information and the second process information are accessed simultaneously using a command line command. In some examples, the command line command is a grep command.

In some examples, the first pair of binary search trees includes nodes, the nodes including address pointers to memory regions for corresponding ones of the first instances of the first application. In some examples, the method further includes detecting the first duplicate memory contents by comparing first data of a first one of the memory regions to second data of a second one of the memory regions.

In some examples, the first pair of binary search trees is a pair of red-black trees. In some examples, the first pair of binary search trees includes a stable tree and an unstable tree, the stable tree representative of deduplicated memory regions, the unstable tree representative of memory regions that have been unchanged for a period of time.

In some examples, deduplicating the first memory contents includes configuring a first one of the first instances of the first application to access a second memory region allocated to a second one of the first instances of the first application and deallocating a first memory region corresponding to the first one of the first instances of the first application.

From the foregoing, it will be appreciated that example methods, apparatus and articles of manufacture have been disclosed that deduplicate heap memory in a container-based cloud computing environment by leveraging characteristics of the cloud computing model such as context information of applications in cloud computing. In this manner, examples disclosed herein implement an application aware KSM (A-KSM) that can improve memory and processor resource usage by not having duplicate contents in heap memory corresponding to multiple instances of the same application in container-based cloud computing environments. In some examples, A-KSM techniques disclosed herein can result in 30% CPU cost savings relative to not using examples disclosed herein.

Figure 9A:
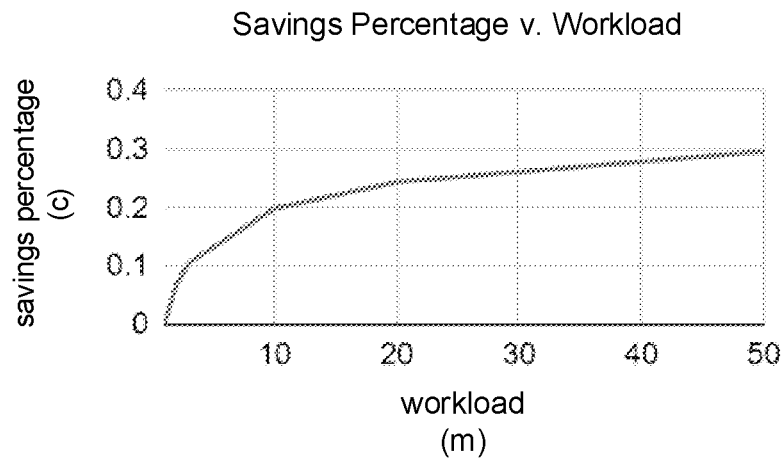
FIGS. 9A-9C are example graphs illustrating system performance values that can be achieved using examples disclosed herein.
Figure 9B:
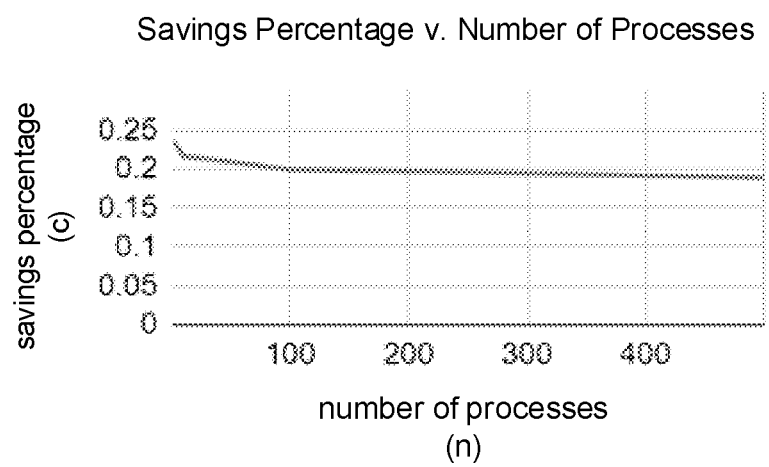
Figure 9C:

For example, FIGS. 9A-9C illustrate example graphs of performance values that can be achieved using A-KSM techniques disclosed herein. In FIGS. 9A-9C, the processor resource savings percentage (c) is represented by the equation $[c=1-(\text{complexity of A-KSM})/(\text{complexity of KSM})]$, where the complexity of A-KSM is represented by the equation $[(x+ky)*m*n*\log y+x*m*n*\log nx]$ and the complexity of KSM is represented by the equation $[(x+ky)*m*n*\log my+x*m*n*\log mnx]$, where m is the number of workloads, n is the number of processes running, x is the number of pages, y is the number of shared pages, k is the merge rate, and (x+ky) is the number of advised pages. For the example performance values of FIGS. 9A-9C, it is assumed that the processes exhibit the same page characteristics regarding page merging.

FIG. 9A illustrates the savings percentage of A-KSM as the number of workloads being executed by the system increases. As shown in FIG. 9A, the processor resource savings percentage of A-KSM increases as the number of workloads increases. For example, as shown in FIG. 9A, when about 5 workloads are being executed by a system, the processor resource savings percentage of A-KSM is about 15%, and when 50 workloads are being executed by a system, the processor resource savings percentage of A-KSM is about 30%. Thus, the processor resource savings percentage of A-KSM increases as the number of workloads increases.

FIG. 9B illustrates the processor resource savings percentage of A-KSM as the number of processes running on the system increases. As shown in FIG. 9A, the processor resource savings percentage of A-KSM decreases slightly as the number of processes increases. For example, as shown in FIG. 9B, when a small amount of processes are running on a system (e.g., between about 1 and 20 processes), the processor resource savings percentage of A-KSM is about 22%, and when about 400 processes are running on a system, the processor resource savings percentage of A-KSM is about 20%. Thus, the processor resource savings percentage of A-KSM stays about the same as the number of processes running on the system increases.

FIG. 9C illustrates the processor resource savings percentage of A-KSM as the merge rate increases. As shown in FIG. 9C, the savings percentage of A-KSM increases as the merge rate increases. For example, when the merge rate is lower (e.g., between about 1 and 10 pages per unit time), the processor resource savings percentage of A-KSM is about 20%, and when the merge rate is higher (e.g., between about 150 and 160 pages per unit time), the processor resource savings percentage is about 25%. Thus, the processor resource savings percentage of A-KSM increases as the merge rate of memory pages increases.

In some examples, methods, apparatuses, and articles of manufacture disclosed herein reduce memory consumption and overhead. In some examples, the methods, apparatus, and articles of manufacture disclosed herein may achieve enhanced memory deduplication to reduce heap memory duplication in container-based cloud computing by leveraging context information of apps in cloud computing. In some examples, the disclosed methods, apparatus and articles of manufacture improve the efficiency of using a computing device by deduplicating duplicate memory in an application-aware manner.

By leveraging the assumption that processes instantiated from the same application have a higher probability of containing duplicate memory regions, examples disclosed herein reduce memory consumption without a significant increase in performance overhead. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to deduplicate memory, comprising:
   interface circuitry;
   machine-readable instructions; and
   at least one processor circuit to be programmed by the machine-readable instructions to:
   group first process information into a first application group based on the first process information indicating first instances of a first application correspond to a same first directory path and first application name;
   group second process information into a second application group based on the second process information indicating second instances of a second application correspond to a same second directory path and second application name;
   generate a first pair of binary search trees based on the first process information for the first application group;
   generate a second pair of binary search trees based on the second process information for the second application group;
   deduplicate first memory contents detected in the first application group based on the first process information; and
   deduplicate second memory contents detected in the second application group based on the second process information.

2. The apparatus of claim 1, wherein one or more of the at least one processor circuit is to detect the first memory contents by comparing first data of a first memory region associated with a first one of the first instances of the first application to second data of a second memory region associated with a second one of the first instances of the first application.

3. The apparatus of claim 1, wherein the first process information includes process identification numbers associated with the first instances of the first application.

4. The apparatus of claim 1, wherein the interface circuitry is to access the first process information and the second process information concurrently based on a command line command.

5. The apparatus of claim 4, wherein the command line command is a grep command.

6. The apparatus of claim 1, wherein the first pair of binary search trees includes nodes, the nodes including address pointers to memory regions for corresponding ones of the first instances of the first application.

7. The apparatus of claim 6, wherein one or more of the at least one processor circuit is to detect the first memory contents by comparing first data of a first one of the memory regions to second data of a second one of the memory regions.

8. The apparatus of claim 1, wherein the first pair of binary search trees is a pair of red-black trees.

9. The apparatus of claim 1, wherein the first pair of binary search trees includes a stable tree and an unstable tree, the stable tree representative of deduplicated memory regions, the unstable tree representative of memory regions that have been unchanged for a period of time.

10. The apparatus of claim 1, wherein one or more of the at least one processor circuit is to deduplicate the first memory contents by:
    configuring a first one of the first instances of the first application to access a second memory region allocated to a second one of the first instances of the first application; and
    deallocating a first memory region corresponding to the first one of the first instances of the first application.

11. A non-transitory computer readable medium comprising computer readable instructions to cause at least one processor circuit to at least:

parse first process information corresponding to first instances of a first application and second process information corresponding to second instances of a second application;

group the first process information into a first application group based on the first process information indicating the first instances correspond to a same first directory path and first application name;

group the second process information into a second application group based on the second process information indicating the second instances correspond to a same second directory path and second application name;

generate a first pair of binary search trees for the first application group based on the first process information and a second pair of binary search trees for the second application group based on the second process information;

deduplicate first duplicate memory contents detected in the first application group based on the first process information; and deduplicate second duplicate memory contents detected in the second application group based on the second process information.

12. The non-transitory computer readable medium of claim 11, wherein the computer readable instructions are to cause one or more of the at least one processor circuit to at least detect the first duplicate memory contents by comparing first data of a first memory region associated with a first one of the first instances of the first application to second data of a second memory region associated with a second one of the first instances of the first application.

13. The non-transitory computer readable medium of claim 11, wherein the first process information includes process identification numbers associated with the first instances of the first application.

14. The non-transitory computer readable medium of claim 11, wherein the computer readable instructions are to cause one or more of the at least one processor circuit to cause access to the first process information and the second process information concurrently based on a command line command.

15. The non-transitory computer readable medium of claim 11, wherein the first pair of binary search trees includes nodes, the nodes including address pointers to memory regions for corresponding ones of the first instances of the first application.

16. The non-transitory computer readable medium of claim 15, wherein the computer readable instructions are to cause one or more of the at least one processor circuit to at least detect the first duplicate memory contents by comparing first data of a first one of the memory regions to second data of a second one of the memory regions.

17. The non-transitory computer readable medium of claim 11, wherein the first pair of binary search trees includes a stable tree and an unstable tree, the stable tree representative of deduplicated memory regions, the unstable tree representative of memory regions that have been unchanged for a period of time.

18. The non-transitory computer readable medium of claim 11, wherein the computer readable instructions are to cause one or more of the at least one processor circuit to at least configure a first one of the first instances of the first application to access a second memory region allocated to a second one of the first instances of the first application and deallocate a first memory region corresponding to the first one of the first instances of the first application.

19. A method to deduplicate duplicate memory, comprising:

parsing first process information corresponding to first instances of a first application and second process information corresponding to second instances of a second application;

grouping, by at least one processor circuit programmed by at least one instruction, the first process information into a first application group based on the first process information indicating the first instances correspond to a same first directory path and first application name;

grouping the second process information into a second application group based on the second process information indicating the second instances correspond to a same second directory path and second application name;

generating a first pair of binary search trees for the first application group based on the first process information and a second pair of binary search trees for the second application group based on the second process information;

deduplicating, by the one or more of the at least one processor circuit, first duplicate memory contents detected in the first application group based on the first process information; and deduplicating second duplicate memory contents detected in the second application group based on the second process information.

20. The method of claim 19, further including comparing first data of a first memory region associated with a first one of the first instances of the first application to second data of a second memory region associated with a second one of the first instances of the first application.

21. The method of claim 19, wherein the first process information includes process identification numbers associated with the first instances of the first application.

22. The method of claim 19, wherein the first process information and the second process information are accessed simultaneously using a command line command.

23. The method of claim 19, wherein the first pair of binary search trees includes nodes, the nodes including address pointers to memory regions for corresponding ones of the first instances of the first application.

24. The method of claim 23, further including detecting the first duplicate memory contents by comparing first data of a first one of the memory regions to second data of a second one of the memory regions.

25. The method of claim 19, wherein deduplicating the first duplicate memory contents includes:

configuring a first one of the first instances of the first application to access a second memory region allocated to a second one of the first instances of the first application; and deallocating a first memory region corresponding to the first one of the first instances of the first application.

* * * * *